April 1, 1969  A. E. HALLÉN  3,435,960
SHIP'S DERRICK FOR CONTAINER HANDLING
Filed Aug. 10, 1967  Sheet 3 of 4

INVENTOR.
Alf Eskil Hallén
BY
Pierce, Scheffler & Parker
his Attorneys

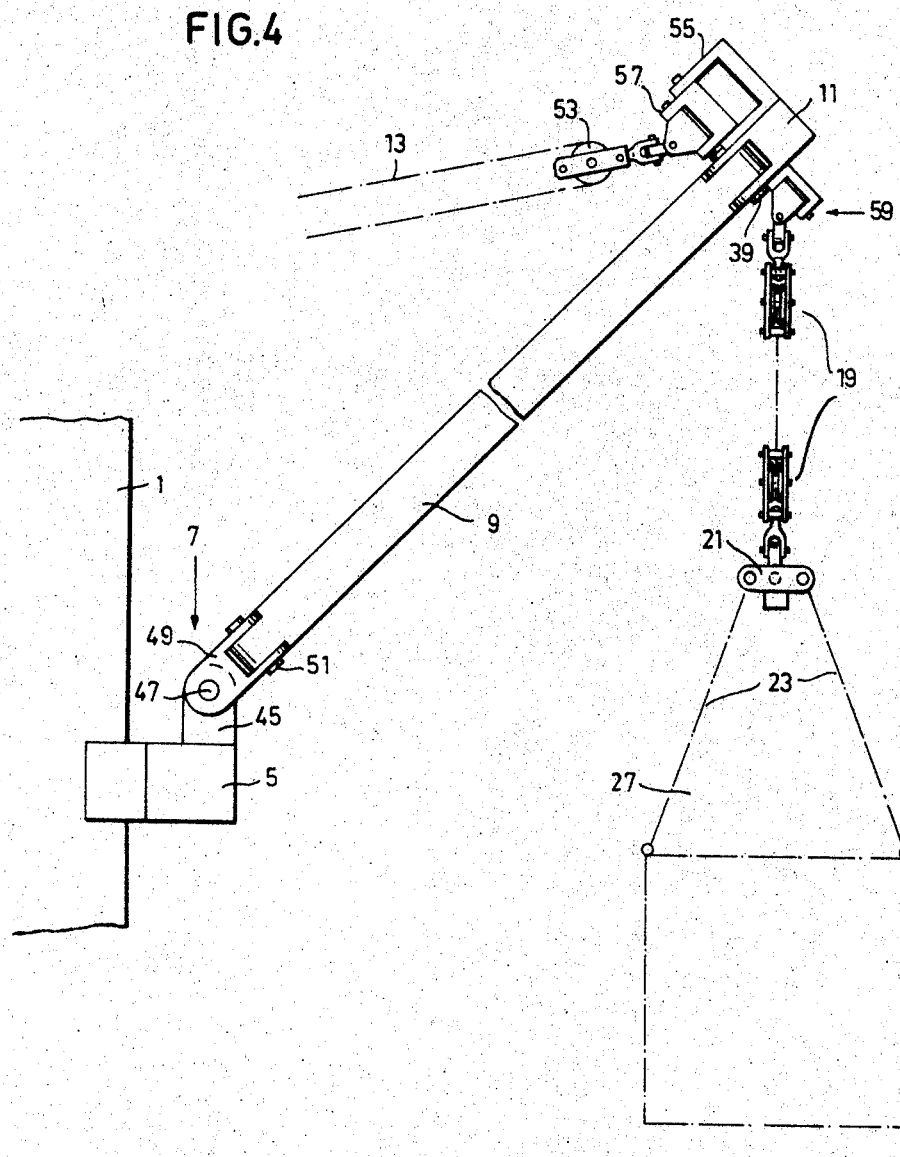

United States Patent Office 3,435,960
Patented Apr. 1, 1969

3,435,960
SHIP'S DERRICK FOR CONTAINER HANDLING
Alf Eskil Hallén, Angsvagen 7, Askim, Sweden
Filed Aug. 10, 1967, Ser. No. 659,660
Claims priority, application Sweden, Sept. 2, 1966, 11,896/66
Int. Cl. B66c 23/52, 23/00
U.S. Cl. 212—3                      4 Claims

ABSTRACT OF THE DISCLOSURE

A ship's derrick for loading and unloading containers and similar large loads while preventing swivelling of the load. The derrick comprises two parallel booms, which at their outer ends are articulated to a common transverse beam. The load is suspended by two spaced load lines which extend between this beam and the load, whereby rotation of the load is prevented.

---

During loading and unloading a container or other cargo it is often desirable to handle the cargo in such a manner, that the container or similar does not rotate or swivel in its suspension but is always moved parallel to itself with pure translational movement. This is especially important when handling containers, which in the ship's holds are stowed close to each other and are secured to each other by means of pins and grooves.

If a container is lifted with a crane or a derrick, which is swung with guide ropes or with the aid of two topping lifts, difficulties may arise in controlling the heavy load in correct orientation. In some instances cranes and cargo derricks have therefore been replaced with large traverses or travelling crane devices which run on rails on the ship's deck and which can maintain the container in exactly desired orientation. These traversing devices are, however, very heavy and expensive cargo handling devices and are consequently used only on larger ships on special trades. A purpose of the present invention is a device, which in a simpler and less expensive manner achieves the same result, that is controlling the movement of container cargo with maintained orientation to the desired position with the aid of cargo derricks.

According to the invention there is accomplished and especially for container handling designed, improved version of for example the derrick arrangement shown in British Patent 1,039,178.

A derrick device, especially for ships, for handling of cargo such as containers, which during loading and unloading must be prevented from rotating, movement of the cargo in the horizontal direction being performed through swinging of the derrick, is thus according to the invention characterized in that the derrick comprises two mutually parallel booms of equal length, the inner ends of which are articulated to two fixed points at the same height but spaced sideways, whereas the outer ends of said booms are interconnected through a rigid beam articulated to said booms, the beam thereby being forced always to assume a position parallel to a line through said fixed points during swinging of said derrick, the cargo being supported by at least two suspension devices spaced along said beam, whereby rotation of the load is prevented.

In this arrangement, the two booms are always parallel and the transverse beam at the boom tips is always held in a position parallel with the line through the boom supports. A load, such as a container hanging below this beam with lines from the ends of the beam is consequently always controlled to move parallel to itself and is prevented from rotating. Further advantages and particulars of the invention will become apparent from the affixed claims and an embodiment of the invention described closer below with reference to the accompanying drawings.

Figure 1:
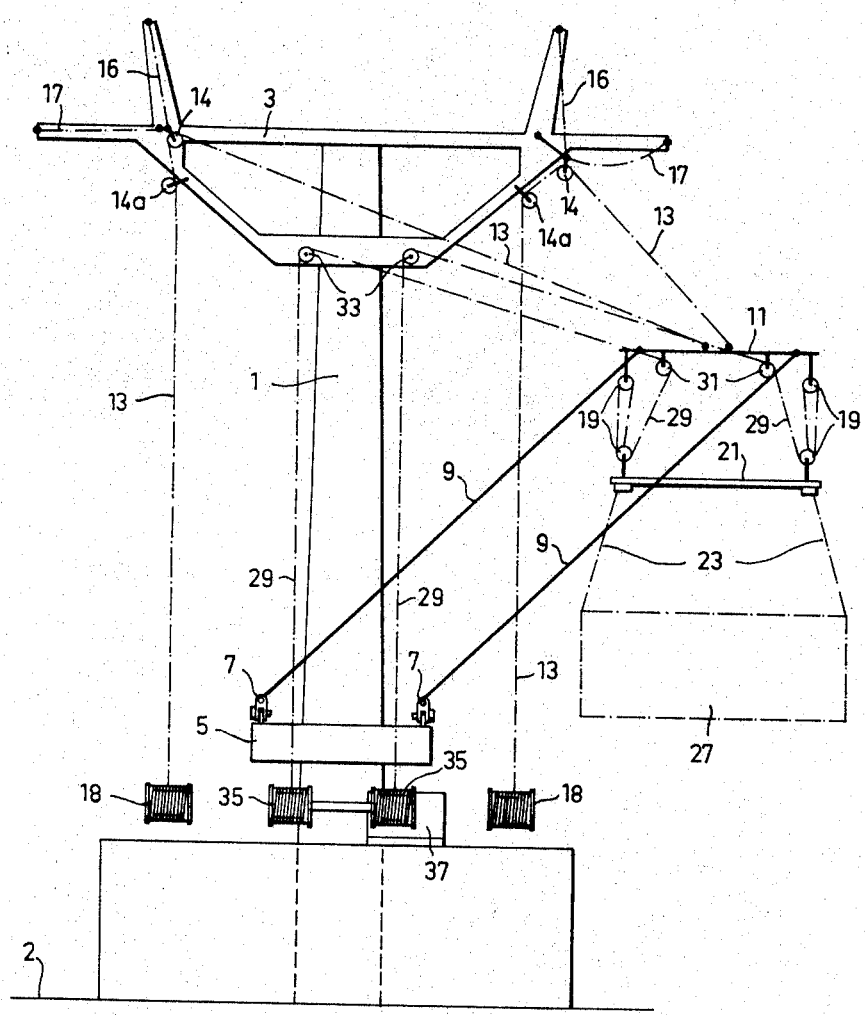
Figure 2:
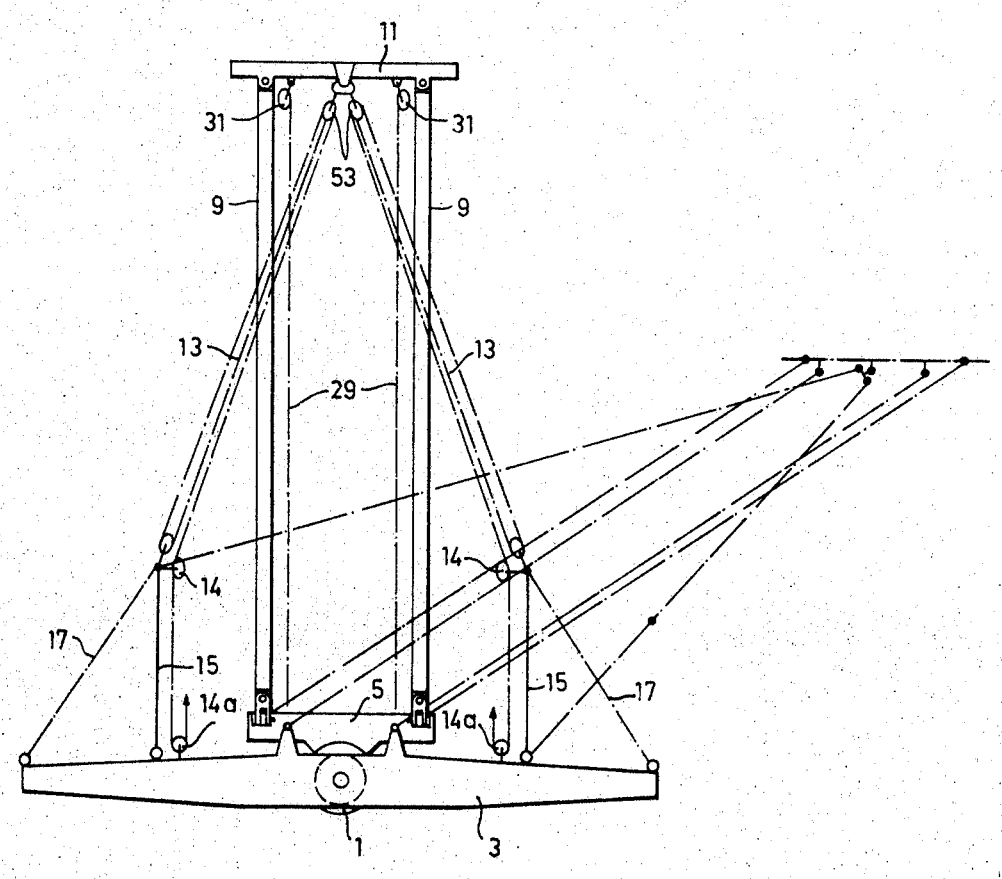
Figure 3:
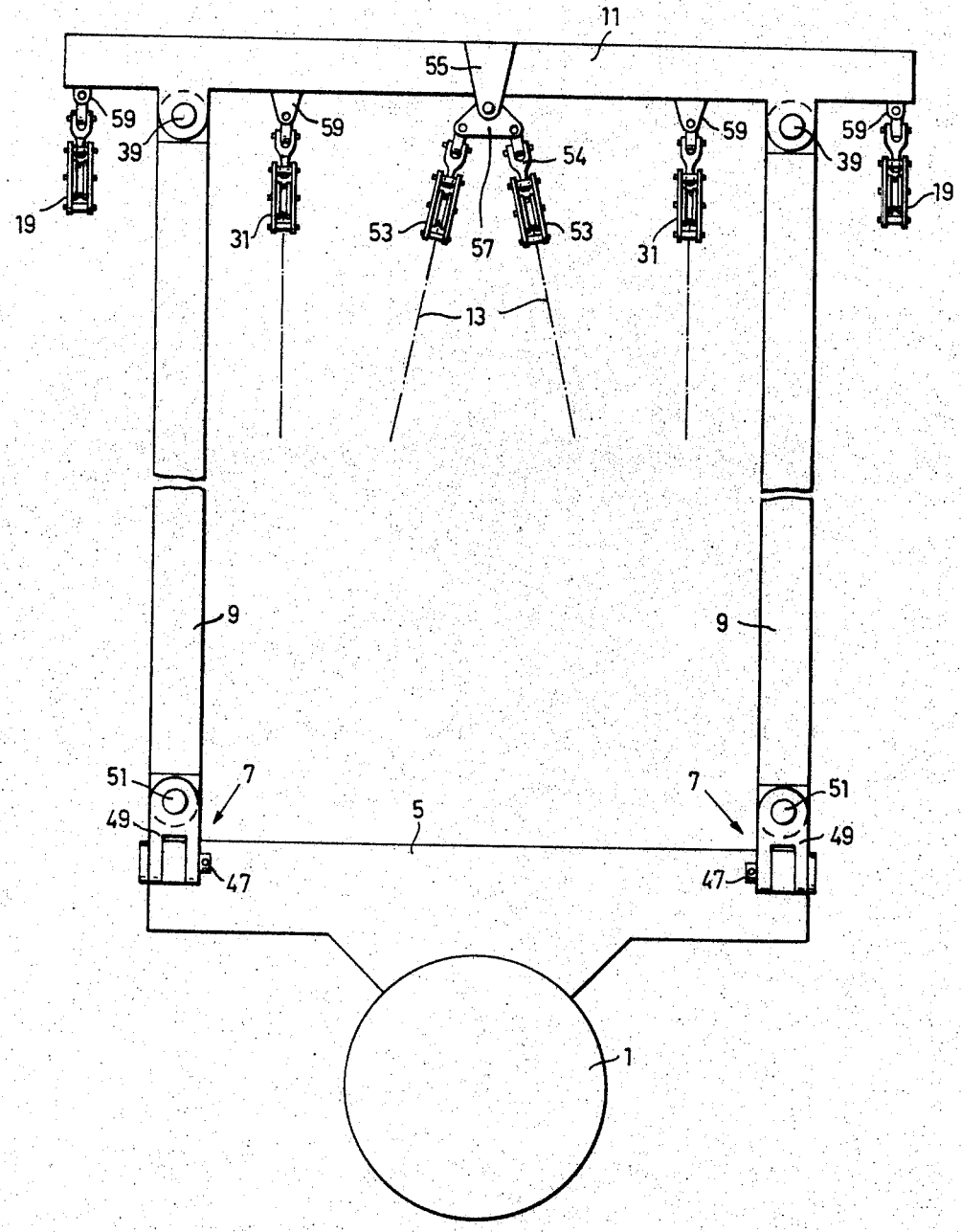

On the drawings, FIGURE 1 schematically shows a ship's mast viewed in the ship's longitudinal direction and provided with a cargo derrick according to the invention. FIGURE 2 shows a plan view of the arrangement of FIGURE 1. FIGURES 3 and 4 show the double derrick in larger scale in plan view and elevation, respectively.

FIGURE 1 thus shows a mast 1 on the deck 2 of a ship. In a manner known per se, mast 1 carries at its upper end an athwartship outrigger 3. On its lower part, this mast is provided with a cross beam 5, the ends of which carry boom supports 7. Two equally long booms 9 are articulated to the boom supports. At their outer ends, the booms are interconnected with the aid of a transverse beam 11. From the center of this beam, two topping lifts 13 extend in a diverging manner towards the outrigger 3.

Each topping lift passes over a leading block 14, which is articulated to the tip of a swivelling arm 15 (FIG. 2), which is articulated to the outrigger 3. The freedom of movement of the swinging arm 15 is limited in the vertical and horizontal directions with the aid of wires 16 and 17 respectively, in a manner described in above mentioned British patent. From the leading blocks 14, the topping lifts 13 pass over further leading blocks 14a on the mast and extend down towards winch drums 18.

At its ends, the transverse beam 11 is provided with load suspending blocks 19 carrying a yoke 21. For handling containers, each end of yoke 21 is provided with two equally long lines 23 with hooks for hooking a container 27. Load lines 29 for raising and lowering the load extend from the load blocks 19 and pass over leading blocks 31 on the transverse beam 11 and leading blocks 33 on the athwartship outrigger 3 to extend down to separate winding drums 35 on a common axis of a load winch 37. These drums 35 are consequently non-rotatably coupled and could if desired be replaced with a divided single winding drum.

The single load winch 37 with two wire drums could alternatively be replaced with two load winches. The winding drums of these two winches should then be interconnected by a shaft in order to obtain equal movement.

The leading blocks 31 are according to FIGURES 1, 2 and 3 located between the booms 9 but could also be located outside these at the outer ends of transverse beam 11. At the same time, the distance between the leading blocks 33 on the mast 1 and the distance between the winding drums 35 would have to be increased so that these distances also in this case correspond to the distance between blocks 31.

With the aid of the topping lifts the two booms 9 can be raised and lowered and also swung sideways. During such movement, booms 9 always maintain their parallel position. The transverse beam 11, which is articulated to the booms 9 by pins 39 perpendicular to the booms, is guided during such movement in such a manner that it always maintains a position parallel to a line through the boom supports 7. The yoke 21 and consequently also the container 27 will therefore always be guided in such a manner that the load does not perform any rotational movement during swinging movements of the derrick.

The booms 9 are locked by the transverse beam 11 in such a manner that they cannot rotate about their own longitudinal axis. In order that the joint at each boom support 7 shall be freely movable and not oppose any boom movement the joint fittings are constructed in the manner shown in FIGURES 3 and 4. Each boom support 7 consists of a double joint, but in contrast with the usual arrangement, such as boom needles, the fixed axis in this instance is horizontal. The cross beam 5 thus carries an upright 45, through which extends a horizontal shaft 47. A joint element 49 is free to swing about this shaft 47 and carries a shaft 51 at right angles to shaft 47. The boom 9 is attached to swing about shaft 51. FIGURES 3 and 4 also show how the topping lifts 13 are fastened to the transverse beam 11. Each topping lift passes over a leading block 53 which is articulated to the transverse beam, for instance by a swivel fork 54 and an element 57 which can swing in a bracket 55 fixed to beam 11. The load blocks 19 and the leading blocks 31 are connected to the beam 11 in a corresponding manner with the aid of joints generally designated 59.

Other loads than containers can also be handled. The yoke 31 is also not necessary for handling a container. Cargo can be strung directly in the load blocks 19. If desired, the load line from load blocks 19 or leading blocks 31 can converge and support a load tackle with hook, such that a twin point or triangle support is achieved and pendulum swinging of the load attenuated. It is also possible to provide the transverse beam 11 with a central block for a single load line with load hook.

In the arrangements described above, load and guide lines have been described as running in single parts over single leading blocks for the sake of simplicity, but it is to be understood that the required number of parts can be used within the scope of the invention in order to achieve required strength.

What I claim is:

1. A derrick device for loading and unloading cargo while maintaining the cargo in a horizontal position and while preventing rotation thereof in a horizontal plane, comprising a pair of parallel, spaced boom elements of equal length, means for universally articulating the adjacent inner ends of said boom elements to a pair of fixed, spaced supports in a horizontal plane, a rigid transverse beam, means for pivotally connecting the ends of said beam to the outer adjacent ends of said boom elements so that the boom elements and the transverse beam always lie in the same plane, thus forming, with a line between the two fixed, spaced supports, a parallelogram, means connected to the transverse beam for swivelling each of the pair of boom elements simultaneously about vertical axes passing through the universally articulating means and for raising and lowering said transverse beam and means located near each end of said transverse beam for supporting a cargo at two spaced points thereon.

2. A derrick device as claimed in claim 1 wherein the means for universally articulating the inner ends of said boom elements comprises a pair of universal joints, one axis of each joint being parallel to a line between the two fixed spaced supports and the other axes of each joint being at right angles thereto and parallel to each other.

3. A derrick device as claimed in claim 1 wherein the means for swivelling each of said boom elements comprises a pair of topping lifts connected to the center of said transverse beam and means for separately tensioning and releasing each of said topping lifts to permit swivelling of said boom elements.

4. A derrick device as claimed in claim 1 wherein the means for supporting a cargo comprises a pair of load lines releasably attached to the cargo at spaced points thereon and means for simultaneously tensioning and releasing said load lines to raise or lower the cargo.

References Cited

UNITED STATES PATENTS

| 1,111,102 | 9/1914 | Sawyer | 212—8 |
| 2,354,182 | 7/1944 | Christoffersen | 212—3 |
| 3,042,222 | 7/1962 | Lehmann | 212—3 |
| 3,107,790 | 10/1963 | Lehmann | 213—3 |
| 3,219,197 | 11/1965 | Hallen | 212—3 |

FOREIGN PATENTS 1,209,042   6/1956   France.

EVON C. BLUNK, *Primary Examiner.*

HARVEY C. HORNSBY, *Assistant Examiner.*

U.S. Cl. X.R.

212—9